United States Patent Office 3,419,372
Patented Dec. 31, 1968

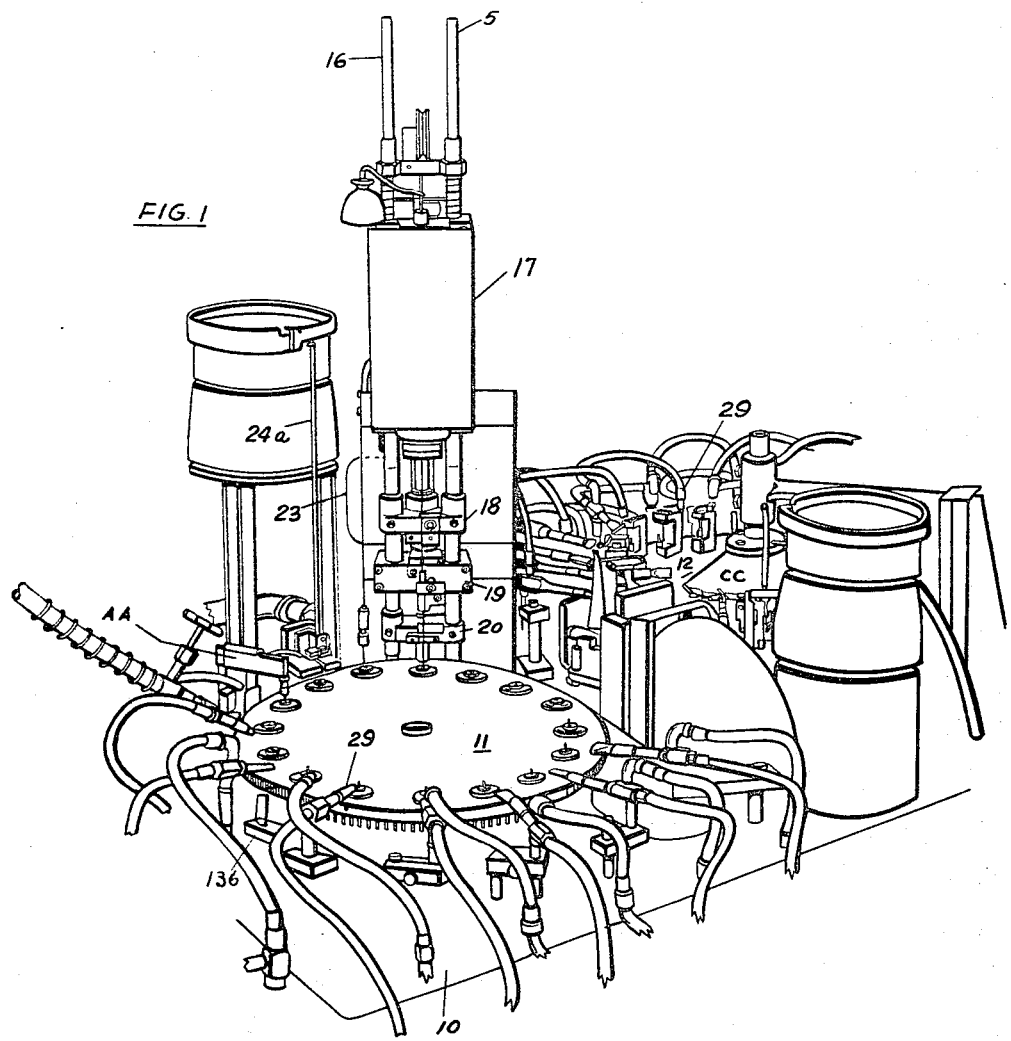

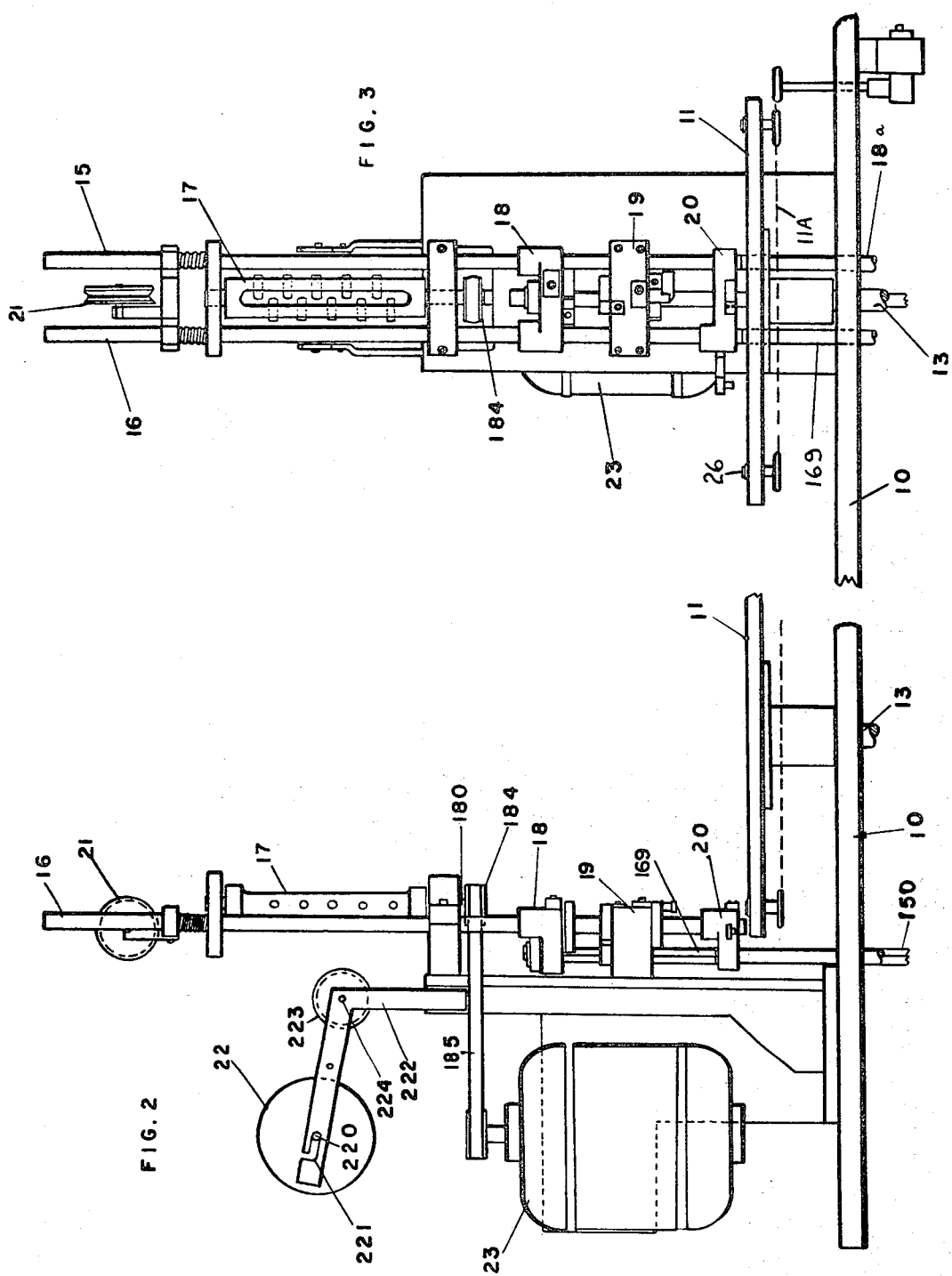

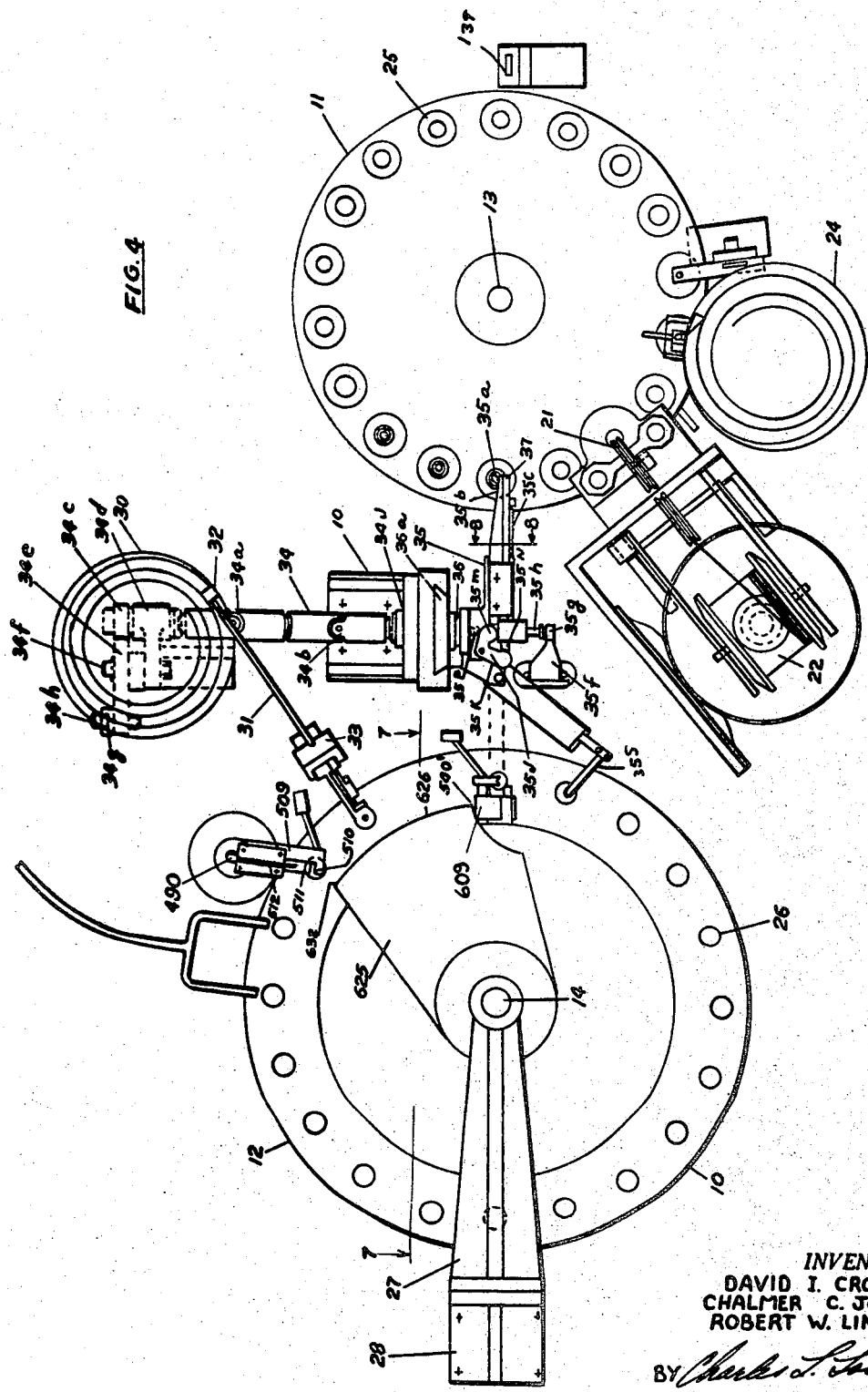

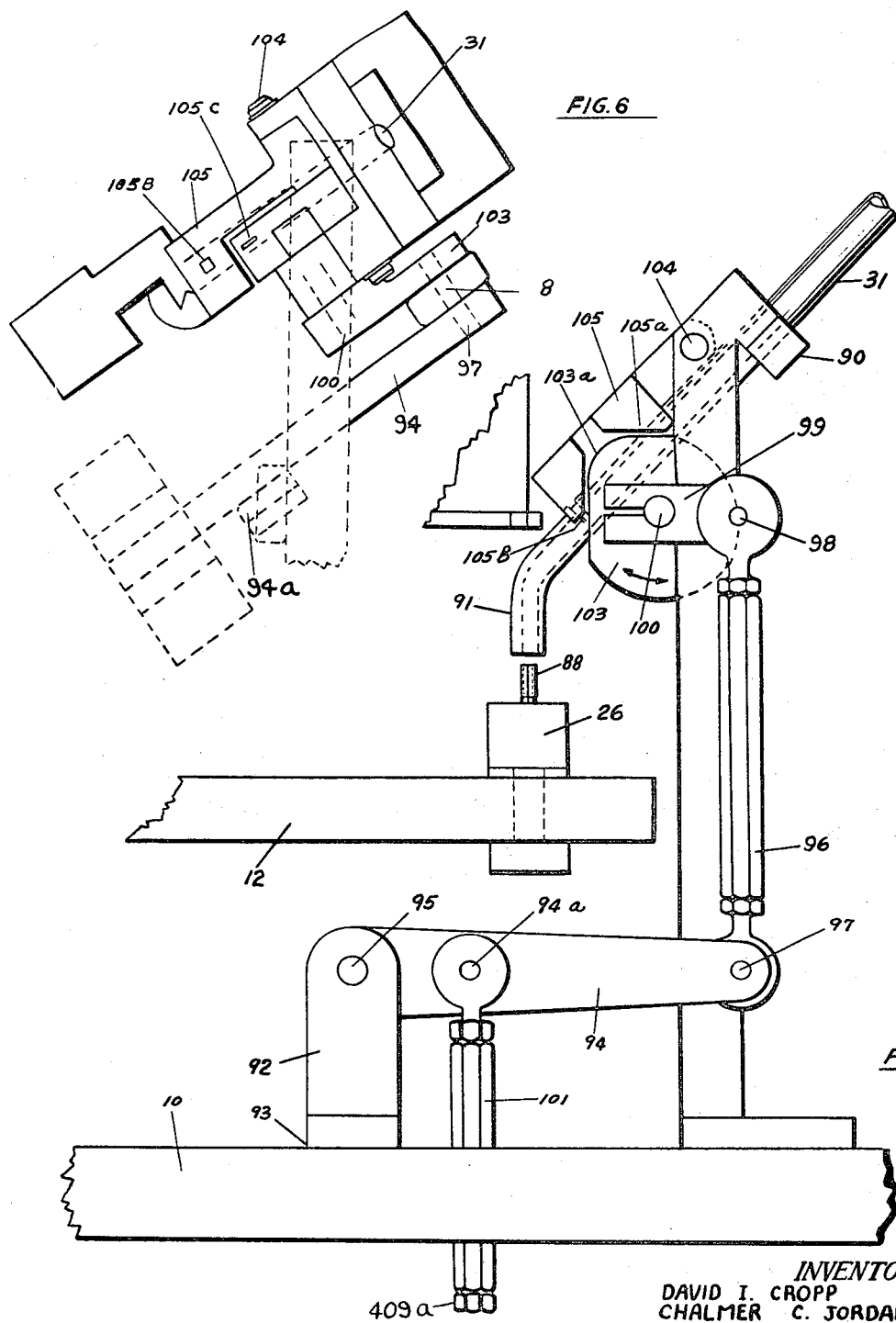

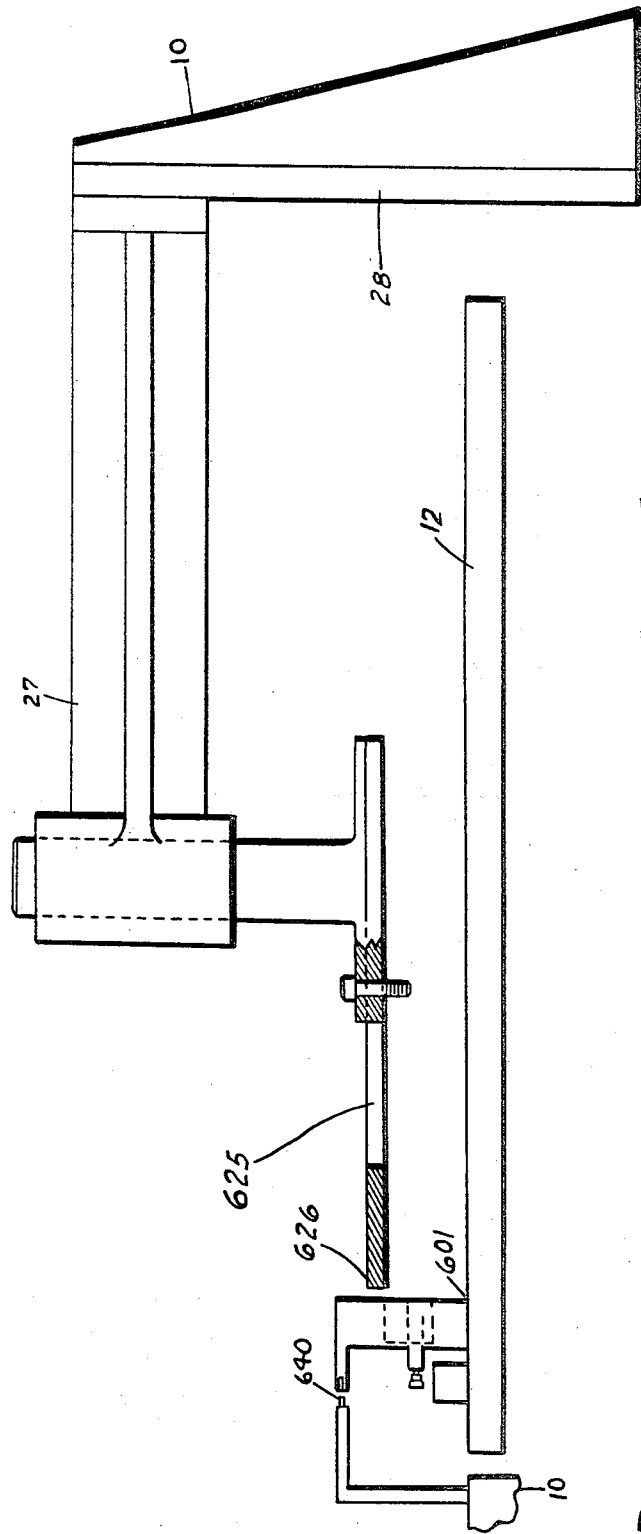

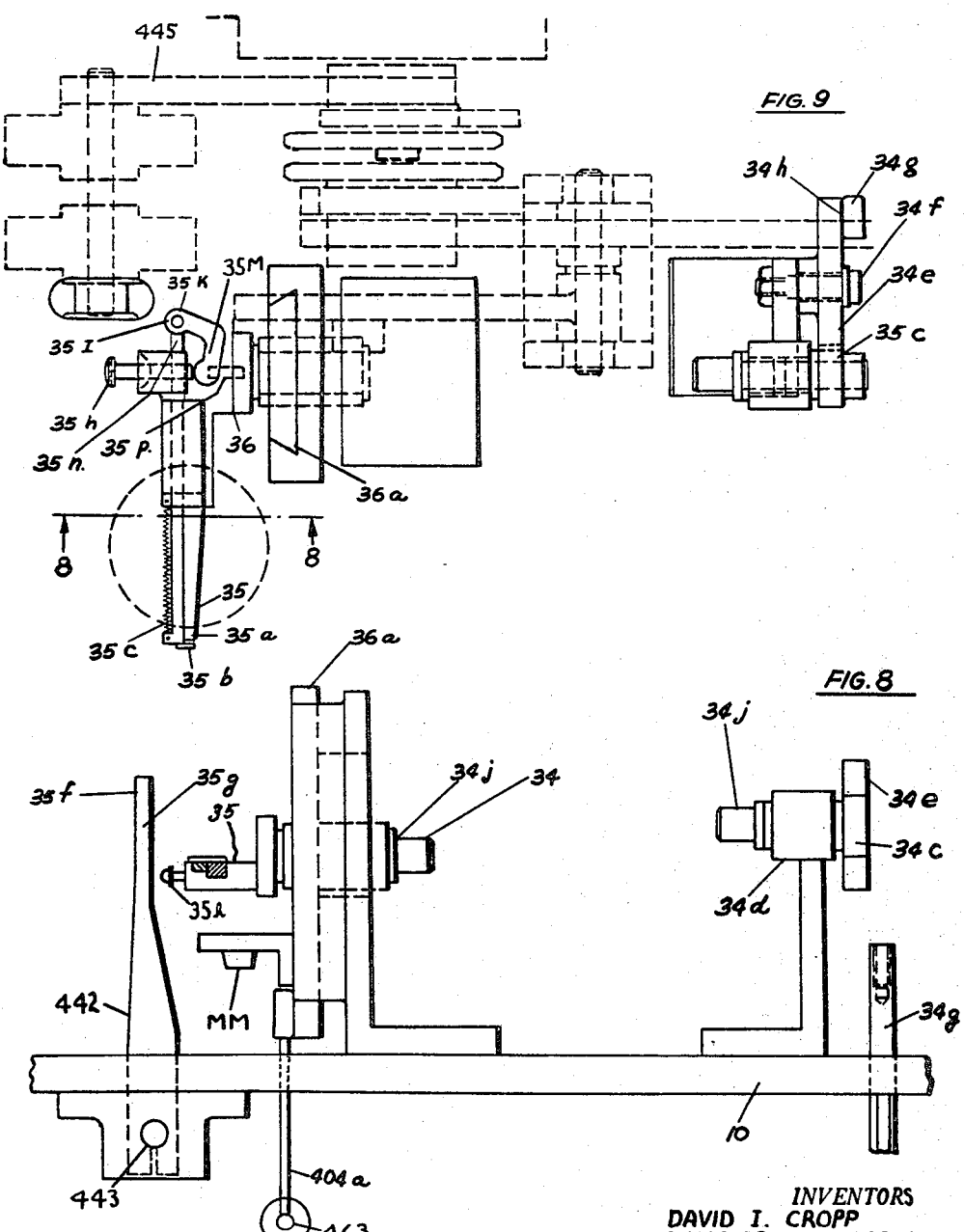

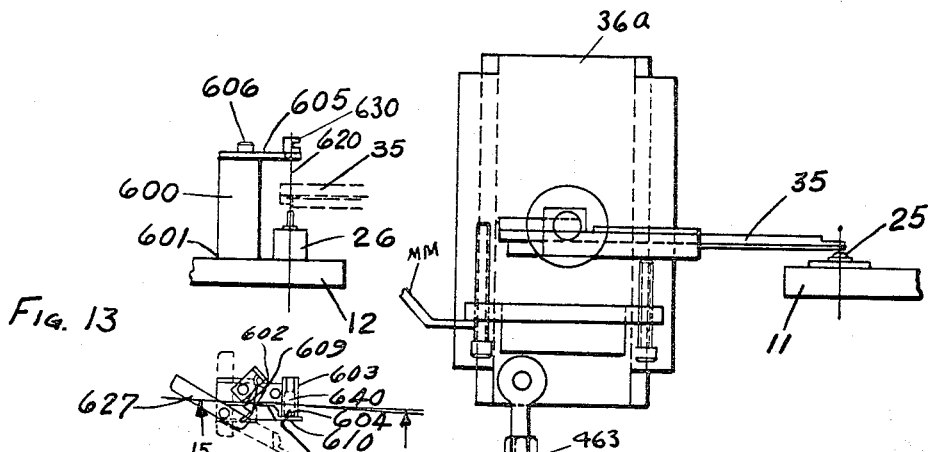
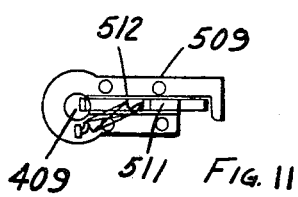
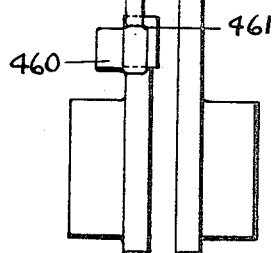
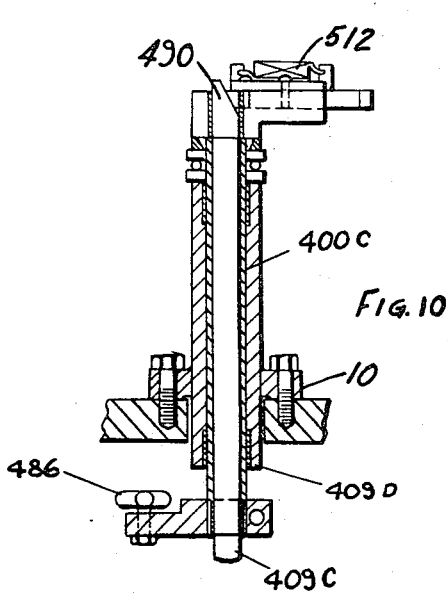
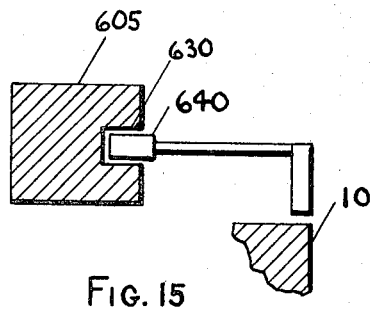

3,419,372
WORK HOLDER FOR ALIGNING AND SEALING A BEADED WIRE ELEMENT INTO A GLASS TUBE
David I. Cropp, Meadville, Chalmer C. Jordan, Saegertown, and Robert W. Lingo, Meadville, Pa., asignors to Glass-Tite Industries, Inc., Providence, R.I., a corporation of Rhode Island
Continuation of application Ser. No. 359,242, Apr. 13, 1964. This application June 29, 1967, Ser. No. 650,136
1 Claim. (Cl. 65—146)

ABSTRACT OF THE DISCLOSURE

An assembly machine for assembling wires to glass tubes made up of a rotating turret having peripherally spaced wire holders on it. An arm connected to the machine and having a wire holder on it to hold a wire while the wire is being carried to the turret by the arm. A permanent magnet for orienting the wire supported above a loading station on the turret. The permanent magnet being supported in a position to attract the wire from the arm and hold the wire in fixed position at the loading station for subsequent movement to a wire holder.

This application is a continuation of Ser. No. 359,242 filed Apr. 13, 1964, now abandoned, which application in turn is a continuation in part of patent application Ser. No. 740,966 filed June 9, 1958, now Patent No. 3,128,529 issued Apr. 14, 1964.

This invention relates to assembling machines and more particularly, to machines for assembling parts including interfitting parts, such as semiconductor housings.

One of the elements of a semiconductor is made up of a wire and bead assembly made up of a small hollow cylindrical glass tube having a wire extending through the opening therethrough with a closure for one end of the tube.

Previous methods and machines for assembling the aforesaid elements of semiconductors have had various disadvantages. The present machine was conceived for the purpose of overcoming the disadvantages of prior machines. The present machine is made up generally of a first turret and associated mechanism for cutting a wire into a predetermined length, straightening it, inserting it into a bead, and hermetically sealing the glass bead to a wire. A second turret assembles the bead and wire into a glass tube. A transfer mechanism transfers the wire and bead to the second turret where the wire and bead are inserted into a glass sleeve and the glass bead is hermetically sealed to the inside of the tube forming a closure for said one end.

In the preferred embodiment of the invention shown herein, the bead and wire assembly turret is made up of a flat plate like table having a top surface disposed in a horizontal plane and rotatable about a centrally disposed axis. An indexing device moves the table intermittently to bring each of sixteen turret heads located on the top surface adjacent the outer periphery thereof on the table successively into position under a wire measuring, cutting and loading station, a feed station at which glass beads are fed down onto the wire, and a plurality of tacking and heating stations where the bead is fused to the wire.

The wire is drawn from a spool of dumit wire of the type commonly used for glass to metal scaling which is supported on the machine and carried down through a rotary wire straightener. Lengths of predetermined size are cut off of the wire and inserted into driven wire rotating assemblies in the spaced positions in the head and pushed down so that the upper end of the wire is located at a given level. The beads are oriented by means of a bowl type vibratory parts feeder and fed down a chute where they are threaded over the wire. The wire and bead then are heated and tacked to the wire. The wire is then lifted to a predetermined position and then cured by passing by a plurality of other stations.

As soon as a given wire and bead assembly has been properly cured by passing selectively through gas flames at the various indexed positions on the bead and wire assembly table, the assembly is then grasped by a transfer device and transferred to the glass tube assembly turret which is also a flat disk like table having approximately twenty driven wire rotating assemblies disposed around the outer peripheral top surface thereof. Heat for fusing the glass bead to the dumit wire and heat for fusing the bead to the inside surface of the glass tube are provided by gas burners which are supported at spaced positions around the turrets. The burners are located around the turret in position to direct a flame onto the article at each station. The turret stops at each station for fusing the glass together and for curing the glass.

More specifically, it is an object of this invention to overcome the disadvantages of prior assembly machines and to provide an improved assembly machine which is simple in construction, economical to manufacture, and simple and efficient in operation.

Another object of this invention is to provide an improved method and apparatus for feeding beads in an assembling machine.

Yet another object of the invention is to provide an improved wire straightening and cutting device for cutting wire into predetermined lengths in combination with a component assembling machine.

Still another object of this invention is to provide an improved machine for cutting wire into predetermined lengths and assembling it on beads and sealing and curing the wire thereon.

It is another object of the invention to provide an improved machine for cutting wire into predetermined lengths, assembling the wire in beads, and hermetically sealing the beads to the wire.

A further object of the invention is to provide an improved machine made up of two horizontally disposed rotatable turrets with a beaded wire assembly device at one turret, a transfer device for transferring the bead and wire assembly from the one turret to the other, and a device for assembling a tube on the bead and wire at the second turret.

Yet a further object of the invention is to provide an improved machine for assembling beads on predetermined lengths of wire, transferring the beads to a second turret, and assembling another component on the beaded wire on the second turret.

A still further object of this invention is to provide an improved support head for supporting the distal end of a wire while the wire is being rotated and heated during rotation.

Still yet a further object of the invention is to provide a machine having a table movable intermittently, spaced article supports on the table, and a support device at each article support, each article support having a permanent magnet fixed to the machine frame for holding the article temporarily at one end and a notch to receive a first end of the article with a lever to swing over the article to hold it loosely as the article is moved in the support while the article is rotated by a force applied to the opposite end thereof.

It is a further object of this invention to provide a support for supporting one end of a wire while it is being heated which firmly holds one end of the wire and rotates it while the other end is supported in a notch, and means to close the open edge of the notch to allow the wire to rotate freely therein.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

In the drawings:

FIG. 1 is an isometric view of a machine according to the invention;

FIG. 2 is a partial side view of the machine;

FIG. 3 is a partial front view of the machine;

FIG. 4 is a top view of the machine;

FIG. 5 is an enlarged partial side view of the tube loader;

FIG. 6 is a partial top view of the machine;

FIG. 7 is a partial side view taken on line 7—7 of FIGURE 4;

FIGS. 8 and 9 are partial top and front views of the wire cut off mechanism.

FIG. 10 is a cross sectional view of the assembly unloader;

FIG. 11 is a top view of the device shown in FIG. 10;

FIG. 12 is an enlarged view of the wire push-up assembly;

FIG. 13 is a side view of the stem support for the second turret;

FIG. 14 is a top view of the mechanism shown in FIG. 13; and

FIG. 15 is a view of the magnet support taken on line 15—15 of FIG. 14.

General description of machine

The machine is made up generally of a frame 10 supporting a wire and bead assembly turret 11 and a glass tube and bead assembly turret 12. The turrets 11 and 12 are fixed to axles 13 and 14, respectively and connecting means is provided to selectively and intermittently rotate the turrets 11 and 12 about their respective axes and stop them at the respective loading, fusing, and sealing stations at predetermined intervals.

Two spaced, parallel, vertically extending columns 15 and 16 support a wire straightening mechanism 17, a wire measuring device 18, a clamp and cut-off 19, and a wire loader 20. The columns 15 and 16 are in turn themselves fixed to the frame 10 at their lower ends and support at their upper ends a guide sheave 21 which guides dumit wire from a spool 22. The wire straightener 17 is rotated at a constant rate of speed by an electric motor 23.

Feeders 24 and 25 may be of the type shown in Patent No. 2,609,914. The beads are fed to the assembling position on the turret 11 by means of the vibratory type bowl feeder 24 of a well known design which feeds the beads in oriented position down a chute to their assembled position on the wire. Wire rotating assemblies 26 are supported at spaced positions adjacent the outer periphery of the bead loading turret 11.

The glass tube assembly turret 12 is similar in many respects to the bead assembly turret 11; however, the glass tube assembly turret 12 in the embodiment shown has a larger number of loading stations than the bead loading assembly turret 11 in order that each loading station will remain in the heat a longer period of time to properly cure the assemblies which are of greater size and volume than the assembly made up of all the components after the tube is assembled.

The wire rotating assemblies 26 are spaced around the upper outer periphery of the glass tube assembly turret 12 on the upper surface and the axle 14 is rotatably supported on a bearing under the table supported on the fixed frame 10. A stationary cam 625 which engages and partly opens the upper wire holders as the wires are transferred is supported on an arm 27 which is supported on the machine frame 10 by means of a vertically extending column 28. One of the wire holders 600 is supported on the turret 12 adjacent each wire rotating assembly 26.

Spaced gas burner jets 29 are attached to the frame 10 and disposed around the periphery of both the bead loading turret 11 and the tube loading turret 12. The gas jets 29 heat the glass and seal the beads to the wire and, subsequently, the gas jets 29 disposed around the turret 12 seal the beads to the inside of the glass tubes.

The machine takes wire from the spool 22, the mechanism 17 straightens the wire, the wire is measured, cut, and loaded into the wire rotating assemblies 26, a bead is fed down over the wire by the feeder 24, the wire is pushed down by the wire push down member B and is heated to tack the bead in place by the first burner and then pushed up by a member A to prevent head damage to the bearings of the rotating assembly, and the wire is then indexed to each of the positions of the wire bead assembly turret 11, being heated to anneal it at each of the positions until it reaches the position under an arm 35 where it is lifted and transferred by the arm 35 into one of the rotating members in the glass tube and bead assembly turret where a glass tube has already been fed by a feeder 30. The wire is held in place temporarily by a magnet while the turret indexes one position during which time an arm closes to hold the wire in position. The wire is then pushed down. Then the turret continues to index, sealing and annealing the tube and bead until the turret reaches the position at the unloading station where the assembly is lifted, swung from over the turret, and dropped by jaws 511.

Transfer mechanism

The transfer mechanism lifts the wires with glass beads cured thereon from the respective wire rotating mechanisms on the turret 11 as they approach the transfer arm. The transfer mechanism has a driving shaft 34 with suitable flexible or universal joints 34a and 34b which connect to the operating arm 35. The arm 35 is swingable in a vertical plane from the position shown through an arc of one hundred eighty degrees to the dotted line position. The shaft 34 is operatively attached to the arm 35 and has a spur gear 34c fixed on the end thereof. The shaft 34 is journalled at the outer end in a bearing 34d to the frame 10. A gear segment 34e is journalled on the frame 10 at 34f and has a link 34g pivoted at 34h. The shaft 34 is also journalled at 34j and fixed to the arm 35 at 36. A cam 408a is driven in timed relation with the indexing mechanism and engages the lower end of the link 34g whereby the link 34g is driven up and down at predetermined intervals, rotating the spur gear 34c and swinging the arm 35 from the full line position shown over the turret 11 to the dotted line position over the turret 12.

A cam 404 engages a rod 404a attached to ways 36a to lift the arm 35 vertically just before it is swung by the gear segment 34c. Thus, when a wire on the turret 11 is first gripped by the arm 35 in a manner hereinafter described, the wire with the bead thereon will be lifted by the arm 35 through the way 36a out of the wire rotating mechanism. Then the arm 35 will swing one hundred eighty degrees to bring the wire with the bead thereon to a position over a wire rotating mechanism in the turret 12. When the arm 35 has swung to this position, the wire will be lowered into the said wire rotating mechanism in the turret 12. The arm 35 will then release the wire as explained hereinafter and the arm 35 will then be ready to swing to a position over the turret 11 for another wire and bead.

A fixed jaw 35a is attached to the arm 35 and extends perpendicular thereto. A movable jaw 35b is slidably disposed on the arm 35 and urged toward the fixed jaw 35a by a tension spring 35c. An arm 35f is attached to the upper end of a lever 35m which extends up through the frame 10 and swings in a horizontal plane therewith. An end 35g of the arm 35f engages a plunger 35h to push it into engagement with one arm of the plunger 35*h* swingably mounted to a bell crank 35*j*. The lower end of the lever 35*m* is actuated by a cam 409. A leg 35*k* of the bell crank 35*j* swingably mounted on the table engages the end of a slide 35*n* attached to the movable jaw 35*b*. The spring 35*c* urges the jaw 35*b* to closed position. Therefore, when the cam 408*a* swings the arm 35, the movable jaw 35*b* will be moved by the spring 35*c* and grip a wire between it and the fixed jaw 35*a*. When the cam 408*a* allows the arm 35 to swing to its rest position, the movable jaw 35*b* will be forced to release the wire by the cam 409.

Glass case assembly mechanism

The glass case assembly is made up generally of a vibratory parts feeder 30, an escapement mechanism 90, and the turret 12.

After each bead is assembled on the cut piece of wire by the first turret and has been hermetically sealed thereto by the heat from the gas flames at successive stations, each wire with a bead thereon is transferred from the turret 11 to the turret 12 into one of the wire rotating assembly members 26 thereon. There, glass cases 88 which have been contained in the bowl of the vibratory feeder and loader 30 are fed down to a feed tube 31. The feed tube 31 has several glass cases 88 therein at all times which are continuously fed to it by the feeder 30; that is, the tubular glass cases 88 are disposed in a continuous line inside of the feed tube 31. The feed tube 31 is attached to the escapement mechanism 90 which releases one tube 88 each time the turret 12 advances or indexes one position.

A bracket 92 is attached to the frame 10 at 93 and fixed in position thereon. A lever 94 is swingably attached to the bracket 92 at 95 and has connecting links 96 pivoted thereto at 97 which are, in turn, pivoted at 98 to a rocker arm 99 attached to a pivot axle 100. A link 101 is swingably attached to the lever 94 at 94*a*. The lower end of the link 101 is actuated by the cam 409 which hooks to a cam 409*a* to be described later. The cam 409*a* is driven by a common shaft and synchronized with the other cams which operate the other elements of the machine. Therefore, a glass tube 88 will be discharged from a nozzle 91 each time the turret 12 advances another rotating assembly 26 into position.

The arm 99 is attached to the axle 100 which is, in turn, attached to a swinging cam lever 103. The lever 103 is in turn rotatably connected to the escapement mechanism 90 at the axle 100. A detent lever 105 is swingably attached to the escapement mechanism 90 on an axle 104 so that when the cam 103 is rotated by the cam 409 through the members 94, 96, and 101, the surface 103*a* will engage lugs 105*a* and swing the lever 105 upward and move a detent 105B out from an opening in the tube 31 from in front of a first glass case 88 in the tube 31 and allow the first glass case 88 to feed through the nozzle 91 into the position shown while the next glass case 88 will be impeded by a detent 105*c* attached to the lever 105 and extending through an opening in the tube 31. As the detent 105B moves downwardly through an opening in the top wall of the tube 31, the detent 105*c* moves upwardly through another opening through the wall of the tube 31 to intercept the second glass case in the aforementioned manner.

Stem loading drive assembly

The stem loading drive assembly is shown in FIGS. 10 to 14. The turret 12 has the spaced article rotating assembly 26. Located at each article rotating assembly 26 is the support for the upper end of the cut pieces of dumit wire being assembled.

The wire holder 600 is attached to the turret 12 at 601 adjacent each article rotating assembly 26. Each wire holder 600 has a laterally extending arm 602 terminating at its distal end in a notched arm 603 having a notch 604 in the end thereof. An arm 605 is swingably attached to the wire holder 600 at 606 and pivots therearound and is urged toward the notched arm 603 by means of a tension spring 609 which swings the end 601 of the arm into engagement with the end having the notch 604. The notch 604 receives the upper end of a wire 620 of the article assembly 26. The depth of the notch 604 is such that when a wire 620 is disposed therein, there is a clearance of approximately two-thousandths of an inch between the edges of the wire and the edge of the notch 604 so that the wire can freely rotate therein. Thus, the upper end of the wire 620 is restrained against lateral movement and freely rotates in the notch 604 when the lower part thereof having the tube thereon is being rotated while being heated so that the wire will not bend. This makes it possible to provide a support for the upper end of the wire without providing a bearing for receiving the wire.

As the turret 12 rotates and a particular article receiving member 26 approaches the loading station under the case load, a cam 625 which is attached to the support bracket arm 27 having a camming surface 626 thereon engages an end 627 of the lever and swings the lever against the tension of the spring 609 to open position and as the transfer arm 35 swings the wire having a bead assembled thereon from the turret 11 into the wire rotating assembly 26, a permanent magnet 640 is supported on the frame 10 and as each wire holder 600 is moved past it as the turret 12 rotates, the arm 605 passes its slot 630 over the stationary magnet 640 and the magnet 640 magnetically attracts the wire and holds it in position temporarily while the end 627 moves into position. Then as the turret 12 indexes to the next position, the arm end 627 moves past the cam 625 and allows the spring 609 to swing an arm 610 into engagement with the end of the arm 602 having the notch 604 therein, thus providing a restraining member to prevent the wire from moving out of the notch 604 again. The arm 610 remains in this position throughout the remainder of the rotation of the turret 12 to the point of pick off at an end 632 of the cam 625.

When the particular article receiving member approaches the station adjacent the unloading device 509, the end 627 on the arm 610 will engage the end 632 of the cam 625 and the arm will be swung away from a notched end 632 and allow the unloading jaws 510 and 511 to grasp the wire and lift it out of the wire rotating assembly, swinging it out over a suitable container and dropping the wire.

The embodiments of the invention in which an exclusive property or privilege is claimed are defined as follows:

1. A machine for assembling tubes on wires comprising
 a support,
 a rotatable member on said support,
 a plurality of spaced article rotating assemblies on said rotatable member for supporting predetermined lengths of said wire,
 spaced wire holders on said rotatable member,
 clamping arm means swingably supported on each said wire holder,
 one said wire holder being disposed adjacent each said article rotating assembly,
 said clamping arms having a first notch therein and a second notch therein,
 said first notch being disposed at right angles to said second notch,
 said second notch being aligned with said rotating assemblies,
 means urging each said clamping arm means to swing toward said second notch in said arms and to overlie said second notch,
 said second notch being adapted to receive a first end of a said length of wire,
 a permanent magnet supported on said support,
 indexing means to move said rotatable member relative to said support whereby said magnet is moved through said first notch and said rotary member is stopped with said magnet in said first notch and said rotatable member stops with said magnet adjacent said second notch, transfer means for moving a said wire length into said second notch when said magnet is in said first notch whereby said wire length is held in said second notch, cam means to move said clamping arm means away from said second notch when said wire holder moves its first notch over said magnet, said cam means allowing said clamping arm adjacent said magnet to move into engagement with said wire length as each said wire holder moves away from said magnet whereby said wire is held in said second notch.

References Cited
UNITED STATES PATENTS 3,273,989   9/1966   Gubituse et al. _____ 65—154

DONALL H. SYLVESTER, *Primary Examiner.*

F. W. MIGA, *Assistant Examiner.*

U.S. Cl. X.R.

65—155, 59; 29—211, 203